Sept. 21, 1954
R. E. YOUELL
2,689,658
STORAGE STRUCTURE
Filed Oct. 6, 1950
5 Sheets-Sheet 1
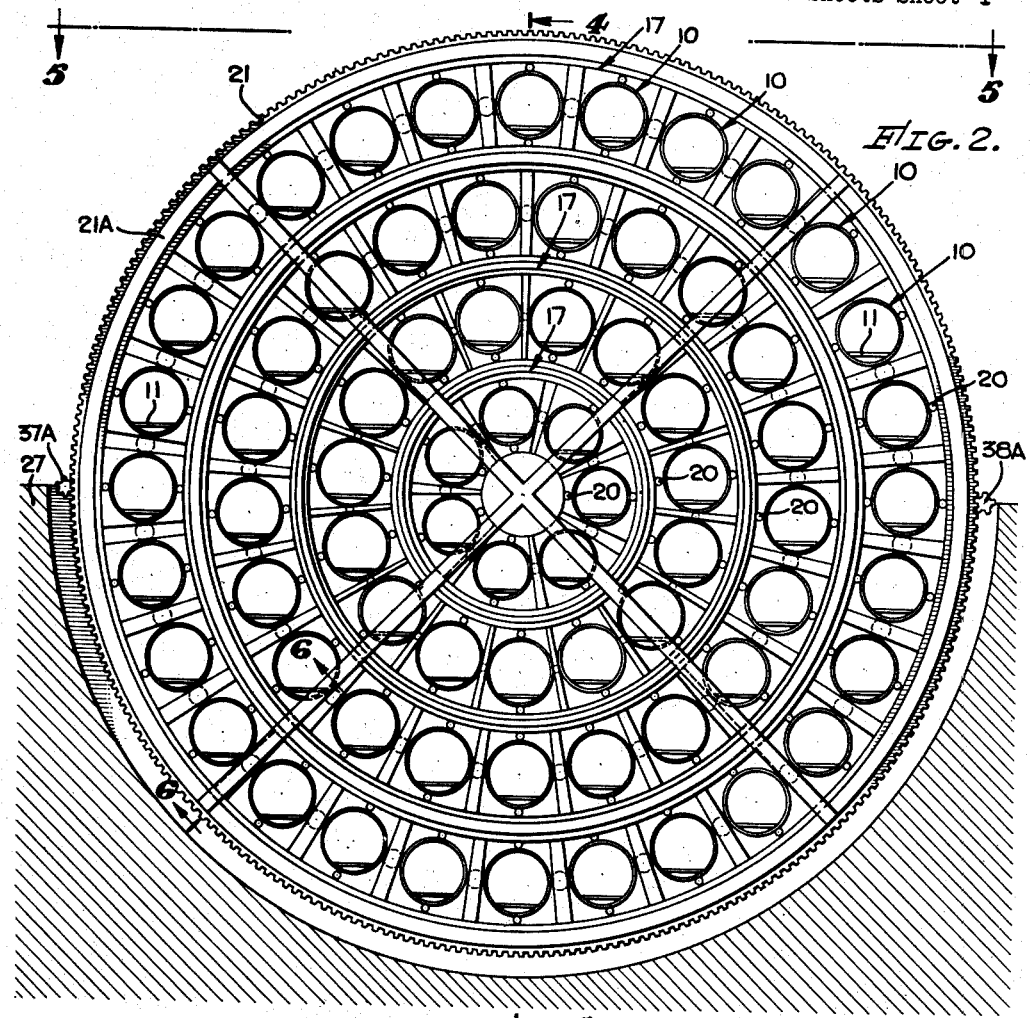
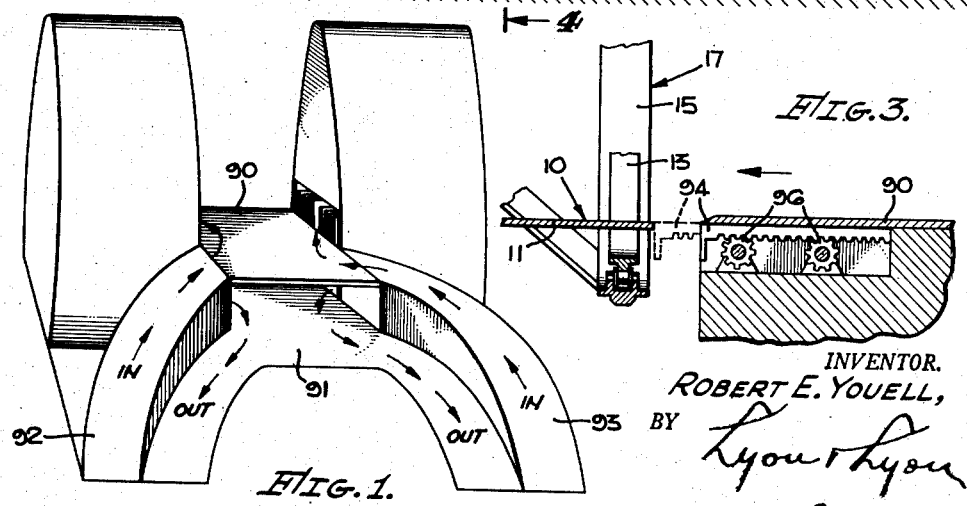
INVENTOR.
ROBERT E. YOUELL,
BY
ATTORNEYS.

INVENTOR.
ROBERT E. YOUELL,
BY
ATTORNEYS.

Sept. 21, 1954  R. E. YOUELL  2,689,658
STORAGE STRUCTURE
Filed Oct. 6, 1950  5 Sheets-Sheet 3
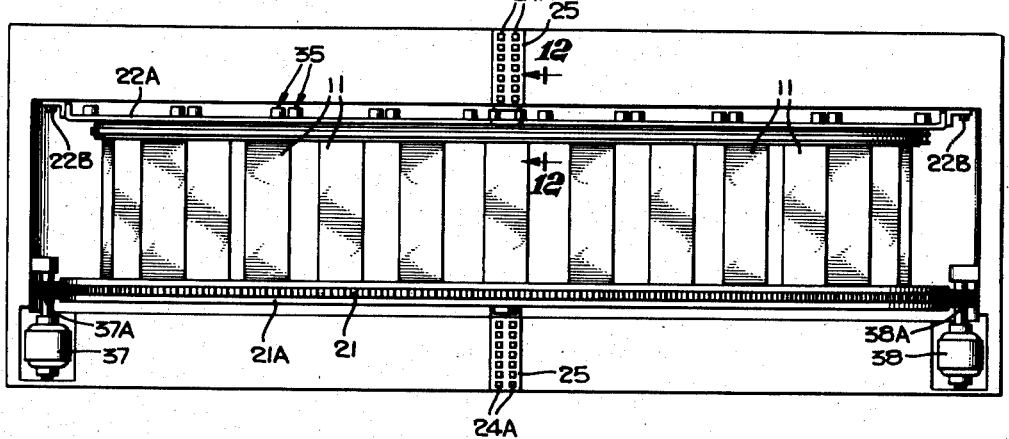
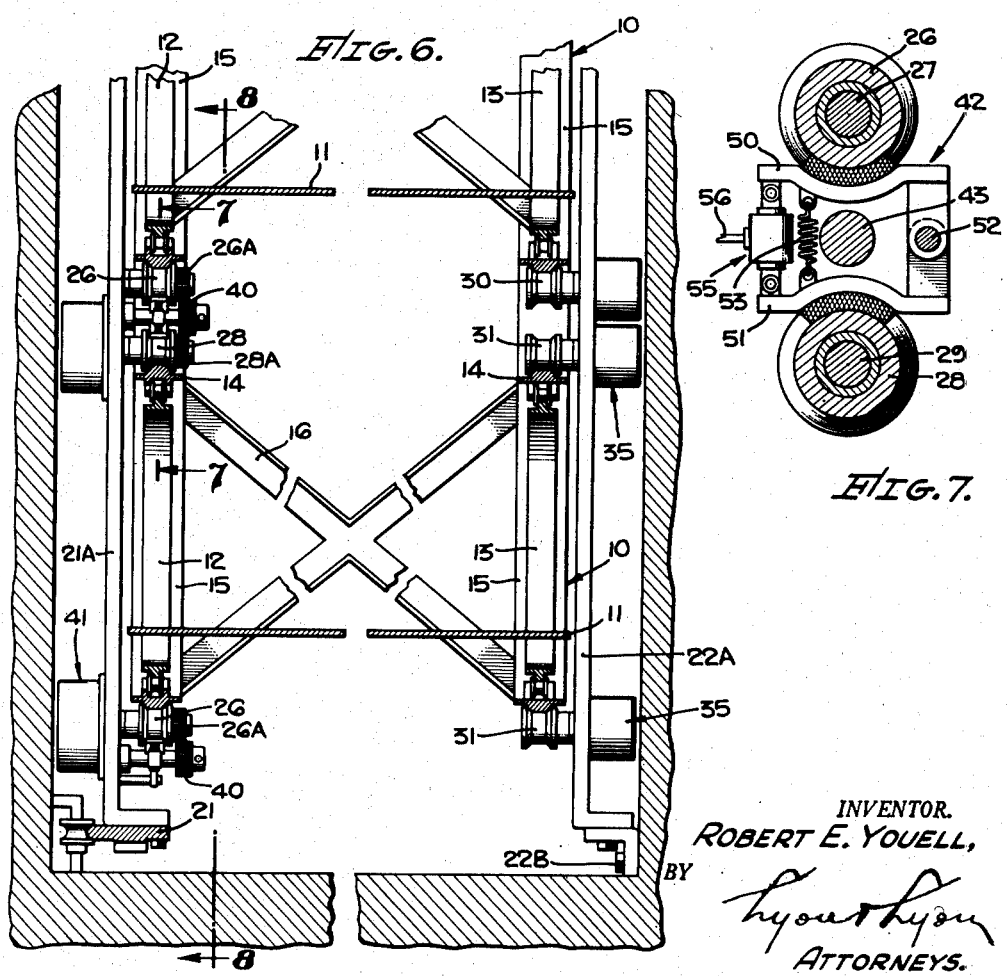
INVENTOR.
ROBERT E. YOUELL,
BY
ATTORNEYS.

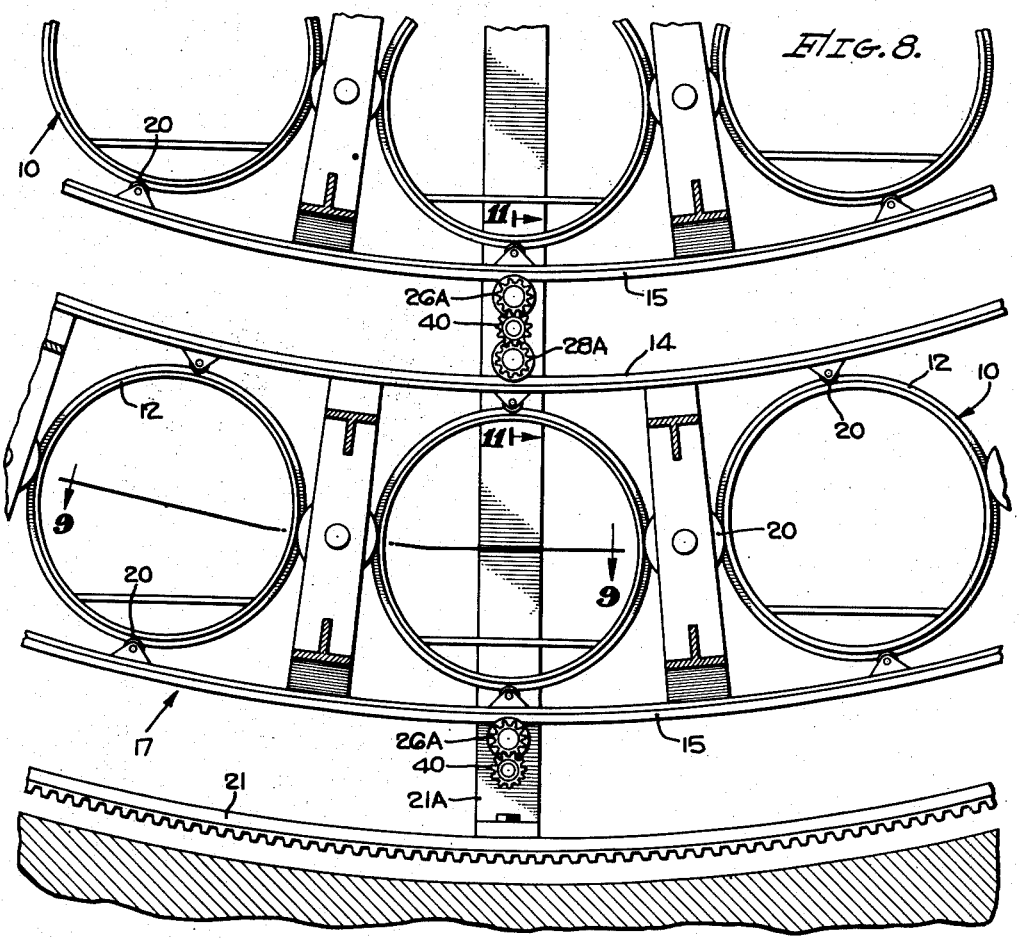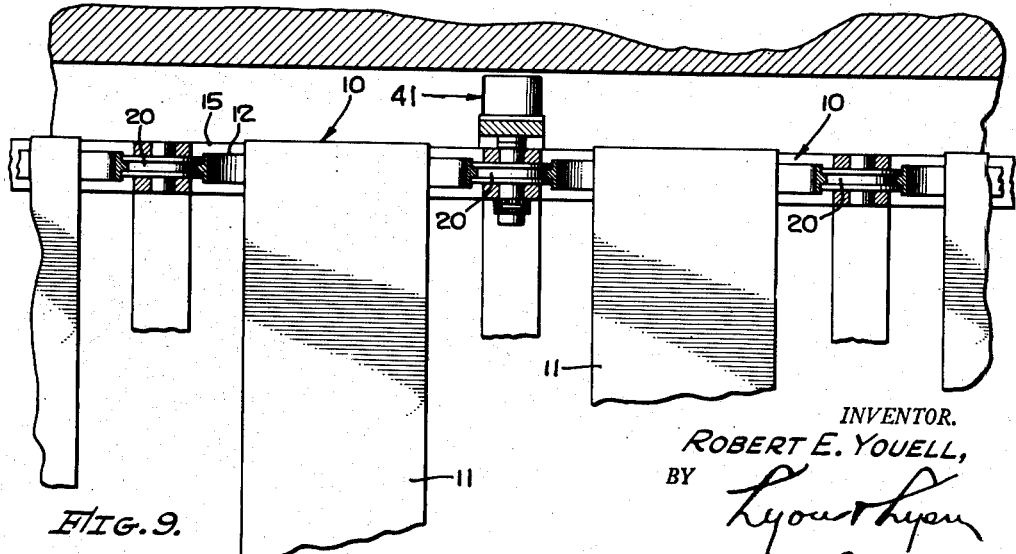

Sept. 21, 1954

R. E. YOUELL 2,689,658

STORAGE STRUCTURE

Filed Oct. 6, 1950

5 Sheets-Sheet 5

INVENTOR.
ROBERT E. YOUELL,
BY
Lyon & Lyon
ATTORNEYS.

Patented Sept. 21, 1954

2,689,658

UNITED STATES PATENT OFFICE 2,689,658

STORAGE STRUCTURE

Robert E. Youell, North Hollywood, Calif., assignor of thirty per cent to Elmer L. Smith, Burbank, Calif.

Application October 6, 1950, Serial No. 188,706

2 Claims. (Cl. 214—16.1)

1

The present invention relates to improved storage structures.

While, the principles and inventive concepts embodied in the structure shown herein may be utilized in storage structures generally, the present structure shown herein is intended for the purposes of storing automobiles.

A storage structure embodying the present invention is characterized by the fact that a relatively small amount of space is required, and is generally a wheel with a plurality of individual rings independently movable therein, each of such rings in turn having a plurality of freely movable receptacles. In particular the arrangement is characterized by the incorporation of means which allows the individual rings to be moved to a balanced position so that the composite wheel may be moved with the application of a relatively small amount of force.

It is therefore an object of the present invention to provide an improved storage structure having the features mentioned above.

Another object of the present invention is to provide an improved storage structure of this character which allows efficient and expeditious ingress and egress of cargo into or out of the structure.

Another object of the present invention is to provide an improved structure of this character characterized by the fact that each of the individually movable rings within the wheel may be selectively moved either singly or jointly with other rings to optimum positions either for loading or unloading purposes or for purposes of balancing the composite wheel.

Another object of the present invention is to provide an improved storage structure of this character in which there are means provided whereby adjacent rings in the wheel may be rotated in opposite directions with respect to each other to obtain a self-balanced wheel.

Figure 4:
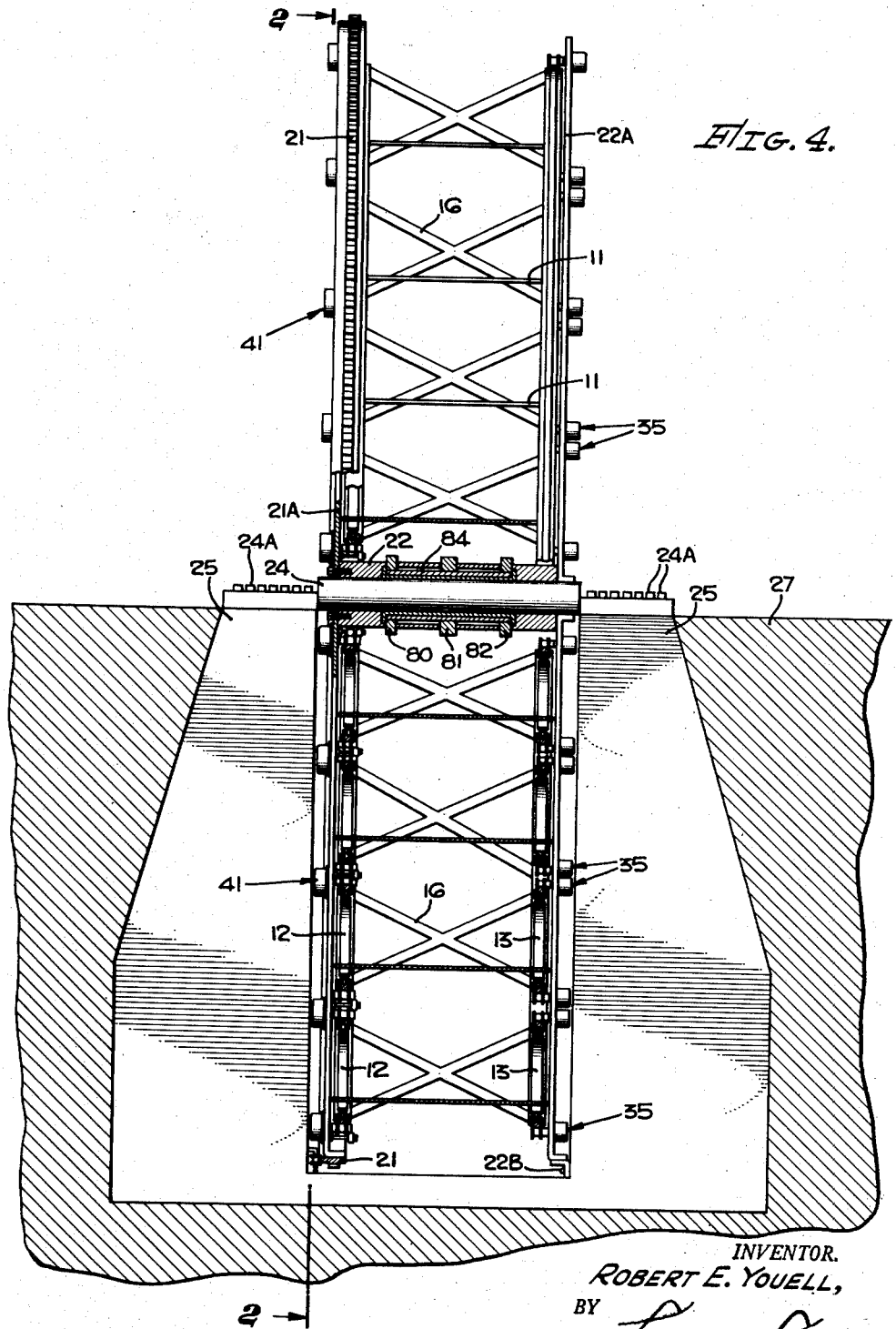

The features of the present invention which are believed to be novel are set forth with particularity in the appended claims. This invention itself, both as to its organization and manner of operation, together with further objects and advantages thereof, may be best understood by reference to the following description taken in connection with the accompanying drawings in which:

Figure 1 is a perspective view showing a pair of storage structures embodying the present invention for purposes of storing automobiles, Figure 2 is a sectional view taken substantially on the line 2—2 of Figure 4,

2

Figures 10, 11, 12:
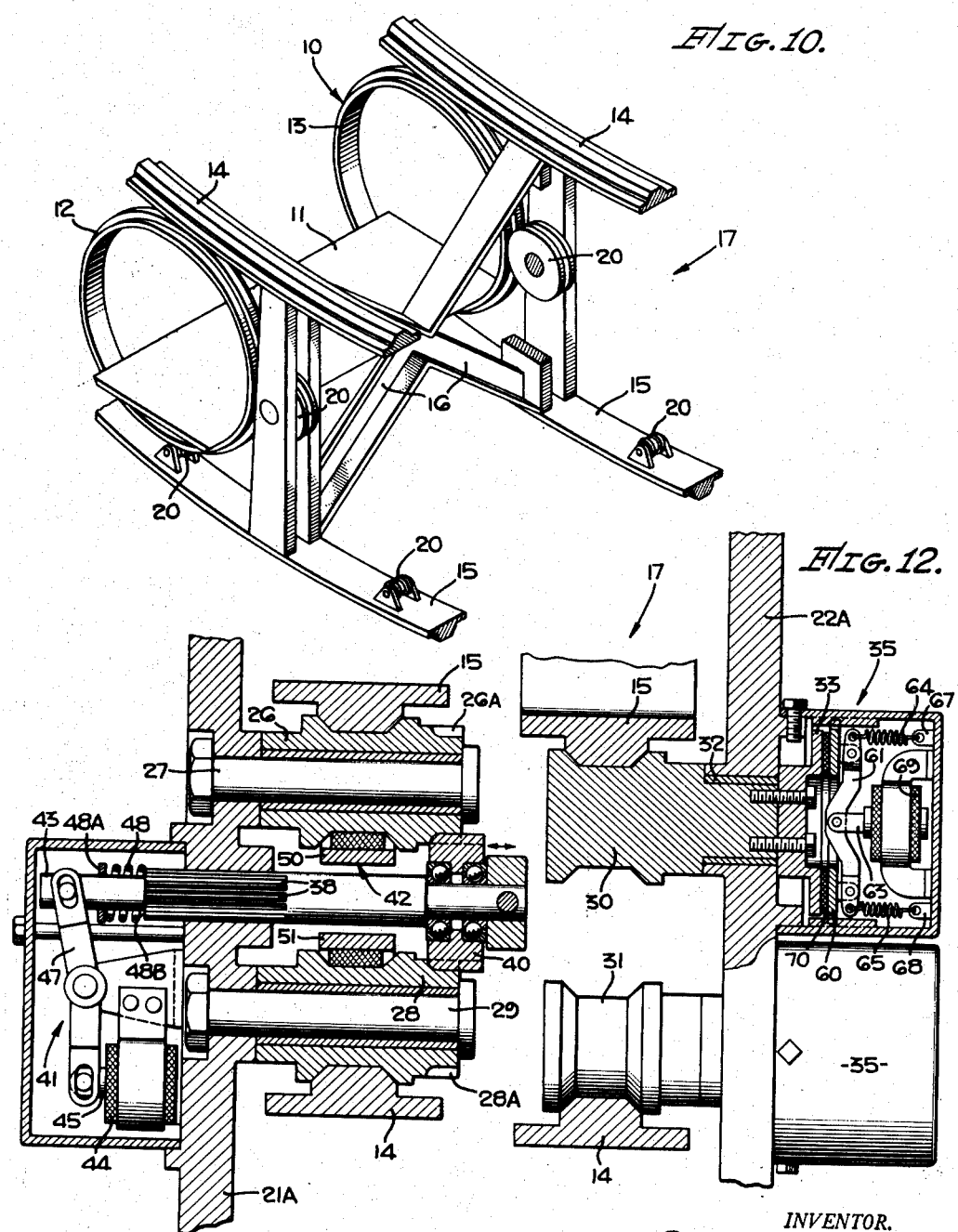

Figure 3 is a sectional view through a portion of the structure in Figure 1 and discloses a movable bridge for spanning the distance between the stationary platform and the cargo platforms on the revolvable storage structure, Figure 4 is a sectional view taken substantially on the line 4—4 of Figure 2, Figures 5 and 6 are views taken substantially on corresponding lines 5—5 and 6—6 of Figure 2, Figure 7 is a sectional view taken substantially on the line 7—7 of Figure 6, Figure 8 is a sectional view taken substantially on the line 8—8 of Figure 6, Figure 9 is a view taken substantially on the line 9—9 on Figure 8, Figure 10 is a perspective view of a portion of one of the movable ring structures with a cargo tray thereon, Figure 11 is a sectional view taken substantially on the line 11—11 of Figure 8, and Figure 12 is a view taken substantially on the line 12—12 of Figure 5.

In the drawings, the storage receptacle is shown as a structure for storing an automobile in each one of the cargo trays 10. These cargo trays as shown in Figure 10 includes an automobile platform 11 mounted on a pair of spaced rings 12, 13; the rings 12, 13 being mounted for free rotational movement on the spaced pair of inner tracks 14, 14 and spaced outer tracks 15, 15. These inner and outer tracks 14, 15 are interconnected by suitable cross braces 16 to form a unitary structure hereinafter referred to as the cargo rings 17.

These cargo rings 17 thus rotatively support a plurality of cargo trays 10, the cargo trays 10 being supported in the rings 17 on rollers 20 which are rotatably supported on the cargo rings 17. These rollers 20 are circumferentially grooved for cooperation with the outer annular flanges on the rings 12, 13 for purposes of guiding the same in their movement.

As seen in Figure 2 the cargo rings 17 are four in number, each of course being of different diameter but each supporting cargo trays 10 in the manner shown in Figure 10.

The cargo rings 17, as described in more detail hereinafter are mounted for relatively independent or joint movement with one or more of the other cargo rings and, or with the large gear 21.

The gear 21 is formed on the periphery of the rotatable X-frame 21A which is affixed to the hub 22 (Figure 4), the hub being rotatably mounted on the stationary shaft 24 which is anchored by means of bolts 24A to the concrete abutment 25.

As seen in Figure 4 substantially one-half of the circular gear 21 is below the surface of the ground 27 while the other half is above the ground, at any one particular time. It is noted that while the X-frame 21A with the gear 21 thereon is rotatably supported, the other parallel spaced X-frame 22A is stationary, the X-frame 22A being affixed to and supported by the concrete abutment 25 by bolts 22B (Figures 4 and 5).

The cargo rings 17 are rotatably supported on the spaced X-frames 21A, 22A in the manner shown in Figures 11 and 12. As seen in Figure 11 the cargo ring track 15 rests on a series of rollers 26 which are rotatably supported on the shaft 27, the shaft 27 being bolted to the X-frame 21A. Similarly the cargo ring track 14 cooperates with the roller 28 which is rotatably supported on the shaft 29, the shaft 29 being likewise bolted to the X-frame 21A. Further, as shown in Figure 12 the other cargo ring track 15 which is the mate of the cargo ring 15 shown in Figure 11, is supported on the guide roller 30 which is rotatably supported on the stationary X-frame 22A. In similar manner the track 14 which is the mate of the track 14 shown in Figure 11 cooperates with the guide roller 31 likewise rotatably supported on the stationary X-frame 22A. The rollers 30 and 31 are supported for rotatable movement in the same manner as shown in the upper portion of Figure 12. Specifically the roller 30 is rotatably supported in the bearing sleeve 32 and has bolted thereto the brake disk 33 which cooperates with the outer wall of the X-frame 22A to take up end thrust in the roller 30. The brake disk 33 and attached roller 30 are thus freely rotatable on the stationary X-frame unless such movement is prevented by the cooperating brake mechanism 35 described in detail hereinafter.

It is thus apparent, from the structure heretofore described, that each one of the cargo rings 17 is freely rotatable with respect to each other and with respect to both the movable X-frame 21A as well as the stationary X-frame 22A.

The X-frame 21A with the gear 21 on the circumference thereof may be driven upon energization of the motors 37, 38 (Figure 5), the output shafts of which have pinions 37A, 38A, respectively thereon for engagement with the gear 21. Normally these motors 37, 38 are used to drive the gear 21. They may be connected as generators for purposes of providing dynamic braking in those instances where it is desirable to check or retard the rotational speed of the gear 21.

These motors 37, 38 are of course solidly mounted as for example on the concrete abutment 25.

In Figure 11 the rollers 26 and 28, in accordance with important features of the present invention may first rotate independently of one another, second, be interconnected together through the gear 40 which is shown meshed with the gears 26A and 28A respectively on the rollers 26, 28 so that the rollers 26 and 28 may be rotated at the same speed but in opposite directions or third, with the gear 40 unmeshed and with the brake 42 (Figures 11 and 7) in engagement the rollers 26 and 28 are locked together for movement as a unit in the same direction. The aforementioned gear 40 (Figure 11) shown in meshed position with the gearing on rollers 26 and 28, serves, in that position, to cause adjacent ones of the cargo ring tracks 15 and 14 to be rotated in opposite directions. This constructional feature is important in obtaining self balancing of the composite wheel in a manner explained in greater detail hereinafter.

The gear 40 may be moved from its normally unmeshed position to its meshed position shown in Figure 11 upon operation of a solenoid actuated mechanism 41 (Figure 11).

This mechanism 41 includes an axially movable splined shaft 43 which rotatably supports the gear 40 and which has splines 38 cooperating with an apertured portion of the movable X-frame 21A. This gear 40 is normally held in unmeshed position by means of the coil compression spring 48 having its ends abutting against the relatively stationary abutment 48A and the other one of its ends abutting against the shoulder 48B on the splined shaft 43. The gear 40 is moved to its meshed position upon energization of solenoid 44. The energization of solenoid 44 results in movement of the armature 45 to the right and movement of the splined shaft 43 to the left to thereby intermesh gear 40 with the gears 26A and 28A on the rollers 26 and 28 respectively.

The locking mechanism 42 whereby the rollers 26 and 28 may be locked together is indicated in Figure 4 and more clearly shown in Figure 7. The brake locking means 42 which includes the arms 50 and 51 pivotally mounted about the same fixed pivot pin 42 is normally maintained in unlocked condition by means of the coil tension spring 53 having one of its ends attached to the lever 50 and the other one of its ends attached to the lever 51 thereby tending to move these two levers together. The levers 50, 51 may be moved apart upon application of pressure to the hydraulic piston-cylinder 55.

This assembly 55 includes two pistons opposite ones of which are connected to the brake levers 50, 51 so that upon application of fluid pressure through the conduit 56 to the assembly 55 results in application of braking force to the pulleys 26 and 28 to thereby lock the same together for movement as a unit. Normally, with the solenoid actuated mechanism 41 in deenergized condition, i. e., with gear 40 out of meshing engagement with the gears 26A, 28A and with the locking mechanism 42 applied, rotation of the X-frame 21A occasioned for example by energization of the driving motors 37, 38, (Figure 5) results in movement of the cargo rings with the X-frame, i. e., the cargo rings remaining relatively stationary with respect to the X-frame 21A so that such cargo rings 17 and X-frame 21A rotates as a unit, i. e., as a whole. If it is desired to maintain one of such cargo rings stationary while the other components of the composite wheel are free to rotate, the corresponding lock 42 is released and the cargo ring locking mechanism 35 (Figure 12) may be actuated to cause that particular cargo ring to remain stationary with respect to the stationary X-frame 22A.

The locking mechanism 35 includes the aforementioned locking or brake disk 33 which cooperates with the movable locking disk 60, the locking disk 60 being linked to the lever 61 having its intermediate portion connected to the movable solenoid armature 63. Coil tension springs 64, 65 each have one of their ends connected to opposite ends of lever 61 and the other one of their ends connected to brackets 67, 68 mounted stationary with respect to the X-frame 22A. These coil tension springs 64, 65 thus normally maintain the locking mechanism 35 in an unlocked condition. The mechanism 35 is locked upon energization of the solenoid winding 69 which results in movement of the armature 63 to the left to press the locking disk 60 into engagement with the ring 70 of composition material between the disks 33 and 60. In the locked condition of locking mechanism 35 the roller 30 is maintained fixed with respect to the stationary X-frame 22A and sufficient static friction is developed between the roller 30 and cargo ring track 15 to prevent relative movement between the roller 30 and track 15.

Thus, when it is desired to maintain any one of the particular cargo rings 17 stationary it is necessary only that the corresponding solenoid 69 (Figure 12) be energized, but, if it is desired to move the remaining cargo rings the corresponding lock 42, is, of course, released.

In operation of the structure described, it is clear that energization of the driving motors 37, 38 (Figure 5) results in movement of the gear 21 mounted on the periphery of the X-frame 21A while the other X-frame 22A at all times remains stationary. During such rotation of the gear 21 and attached X-frame 21A, the cargo ring 17 moves therewith as a unit provided of course, that the solenoid 44 (Figure 11) is deenergized and the solenoid 69 (Figure 12) is likewise deenergized. If it is desired to maintain one of such cargo rings 17 stationary while the others are rotated, the corresponding solenoid 69 (Figure 12) is energized to thereby lock that particular cargo ring 17 with respect to the stationary X-frame 22A. It is clear that one or more of such cargo rings 17 may thus be locked in a stationary position. Preparatory to energizing the driving motors 37, 38 it may be desirable first, to obtain a balanced condition of the cargo rings 17. For example some of the cargo trays 10 may have automobiles therein while any others may be unoccupied. Under these conditions with the gear 40 in meshed position as shown in Figure 11 and with the locking mechanism 42 released, the corresponding adjacent cargo rings 17 move in opposite directions under the influence of unbalanced forces thereon to a static balanced position. Thereafter these two cargo rings thus balanced may be locked together upon actuation of the locking mechanism 42 and the cargo ring 17 adjacent to the locked assembly may similarly be interconnected through the corresponding gear 40 to likewise effect balancing of this second cargo ring 17. This procedure may be carried on in steps until all of the cargo rings 17 are balanced. Thereafter with all of the rings 17 locked together and balanced, a smaller amount of driving torque need be applied to the gear 21. It is clear that this feature results in relatively small power requirements for driving the composite storage structure as a unit even though, automobiles may be randomly located in the various cargo trays 10. Different means may be provided for locking or retarding the speed of the composite wheel. Such means, as indicated above, may include electrical connections whereby the driving motors 37, 38 may be used to produce dynamic braking, the rim brake (not shown) may be applied adjacent the periphery of the gear 21 or, as shown in Figure 4, expansible rings 80, 81 and 82 carried on the movable hub 22 may be actuated to press the brake shoe 84 into engagement with the stationary shaft 24 for this purpose.

It is within the province of one skilled in the electric art, to interconnect the solenoid windings 44, 69 with relays and switches to effect the different control operations mentioned hereinabove, as well as to provide associated switches and relays for controlling the flow of fluid under pressure to the cylinder piston assembly 55 shown in Figure 7.

While the storage structure as shown is for storing automobiles it is readily apparent that the structure and inventive concepts embodied therein may be used in arrangements for storing other objects or materials and the particular use of the structure shown herein serves to exemplify these other uses.

In the particular arrangement shown in Figure 1 two rotatable storage structures of the type described hereinabove are coaxially arranged and spaced from one another with an upper platform 90 and a lower platform 91 therebetween. Ramps 92, 93 are used to drive the automobiles up to the upper level 90 from where they enter either one of the two storage structures. These automobiles may thereafter be delivered to the lower level 91 when called for. In order to provide a bridge between, for example, the upper level 90 and the adjacent cargo platform 11, an extensible bridge structure 94 may be provided as shown in Figure 3. This extensible bridge structure 94 is moved either to a retracted or extended position, upon energization of driving means associated with the driving gears 96.

It is apparent that the particular means described above in connection with the different cargo rings allows the structure to be used and a particular cargo ring to be moved in different manners. For example, the unbalanced weight on the other cargo rings may be utilized, by locking such cargo rings together as a unit, to move a particular cargo ring. In other words, the unbalanced weight or nature of the structure may be used to advantage in producing useful work, and after such work has been performed the composite wheel is in a more balanced condition than it was theretofore. By thus utilizing the unbalanced weight on any one particular cargo ring, or group of cargo rings, to move a predetermined ring to a particular position, the rings are moved into a more balanced condition, i. e., there is less unbalanced weight on the composite wheel and a smaller amount of torque need be supplied to drive the composite wheel.

It is apparent that some of the principles incorporated herein may be utilized for other purposes. For example, the principle and structure incorporated herein, whereby two adjacent cargo rings are moved in opposite directions, may be used on, for example, an automobile wheel for purposes of balancing the same. In such case, the automobile wheel need be provided with only two concentrically arranged rings with gearing between the two whereby such rings are moved in opposite directions to a position where the net effect of the unbalanced forces on each of the rings serves to balance the composite wheel. When this condition is realized the two rings are then locked together and the wheel is balanced.

In some uses of the composite wheel for storing smaller articles than automobiles; for example, books, weights may be placed in some of the rings to produce an unbalanced condition in a plurality of the rings, and the unbalanced weight on such plurality of wheels may then be used to move one of the other rings upwardly as an elevator. In such instances it is not necessary to apply any motive power to move such particular cargo ring.

It is noted that each one of the cargo trays in the cargo rings are self-balancing, i. e., the weight of the platforms in each cargo tray being sufficient to rotatably move such tray in its respective ring when and as the ring rotates, so that at all times the plane of the platform in the cargo tray is substantially horizontal.

While means are provided herein for positively locking the rollers 26, 28, 30 and 31 which support the concentric cargo rings, it is understood that the same means serve to lock the particular cargo rings engaged by the corresponding rollers inasmuch as there is no appreciable slippage between the rollers and their corresponding cargo rings.

While the particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

I claim:

1. In a storage structure of the character described, a rotatable frame, a plurality of individual cargo rings concentrically mounted for individual rotation on said frame, each of said cargo rings having mounted thereon a plurality of self-balancing cargo trays, some of which may be occupied, a stationary frame spaced from said rotatable frame and extending generally parallel therewith, locking means between adjacent cargo rings to lock the same together whereby they may be moved as a unit, means selectively coupling said adjacent cargo rings together for relative movement in opposite directions, and locking means mounted on said stationary frame for selectively locking a particular one of said cargo rings to said stationary frame.

2. In a storage structure of the character described, a frame, a single power means only for rotating said frame, individual concentric cargo rings, means rotatably supporting each of said rings on said frame for rotation about a horizontal axis, means carried by said frame for selectively interconnecting adjacent concentric rings for rotational movement in opposite directions, and means whereby the unbalanced force on one of such rings may be utilized to move a ring adjacent thereto.

References Cited in the file of this patent

UNITED STATES PATENTS

| Number | Name | Date |
|---|---|---|
| 1,154,611 | Burpee | Sept. 28, 1915 |
| 1,340,045 | Hamilton et al. | May 11, 1920 |
| 1,431,930 | Campbell | Oct. 17, 1922 |
| 2,297,199 | Buddecke | Sept. 29, 1942 |